United States Patent [19]

Trinne et al.

[11] 3,927,700
[45] Dec. 23, 1975

[54] BOTTLE FILLING MEANS AND METHOD
[76] Inventors: John Thomas Trinne, Box 197, Greenock Road, Nuriootpa, Australia, 5355; Leslie John Wilksch, King St., Stockwell, Australia, 5350
[22] Filed: June 12, 1974
[21] Appl. No.: 478,539

[30] Foreign Application Priority Data
June 25, 1973 Australia............................. 3818/73

[52] U.S. Cl........................................ 141/5; 141/54
[51] Int. Cl.²........................................... B65B 3/04
[58] Field of Search ........... 426/477, 474, 365, 312, 426/404; 99/79, 275, 49, 182, 189, 27 S; 261/DIG. 7; 141/5-8, 39, 54, 59, 14, 230

[56] References Cited
UNITED STATES PATENTS
3,832,474   8/1974   Karr.......................................... 141/5

Primary Examiner—Houston S. Bell, Jr.
Attorney, Agent, or Firm—Jay L. Chaskin, Esq.

[57] ABSTRACT

Means for filling a wine bottle quickly and under conditions which avoid aeration and consequential oxidation, comprising a reservoir wherein liquid level is maintained, a syphon tube, and a gas conduit directed in the direction of liquid flow through the syphon tube.

When a bottle surrounds the depending arm of the syphon tube and inert gas is injected thereinto,
 a. the bottle becomes filled with inert gas, and
 b. the syphon action commences, continuing until the level of wine in the bottle is the same as the liquid level in the reservoir.

12 Claims, 11 Drawing Figures

BOTTLE FILLING MEANS AND METHOD

This invention relates to a means for a method of filling bottles with liquids, and is particularly applicable to liquids which, like wine, require to be transposed from a filling container into a bottle without aeration and consequential oxidation.

BACKGROUND OF THE INVENTION

Many liquids, for example liquids which are liable to frothing or which are liable to deterioration due to oxidising, are filled into bottles by a relatively slow filling process. Thus for example, delicate table wine is usually filled into a bottle by discharging the wine through a filling tube which terminates at its lower end in a plurality of radially extending apertures, the apertures directing flow of the liquid to the inner side walls of the bottle at or near its neck, the wine "hugging" the side walls of the bottle to ensure that a minimum of aeration takes place. However, this system is not desirably effective for two reasons. Firstly, the filling rate is reduced by the aperture size, since to avoid inclusion of air it is necessary to utilise relatively small aperture sizes so that the film of wine which passes down the inner walls of the bottle remains thin. This causes a further problem, in that the filling speed is slow, and requires unnecessary investment in both labour and equipment. Notwithstanding the precautions which are taken however, the wine is frequently turbulent as it passes from the outlet apertures to the walls of the bottle and again as it passes from the walls of the bottle to the wine already in the bottle, and aeration does take place in some instances to a degree which results in sufficient oxidation for there to be a deleterious effect on a delicate wine.

One object of this invention is to provide an improved means and method for the filling of bottles which will enable the bottles to be filled at a relatively high speed, and a second object is to provide means which will be more effective than previously proposed means in avoiding oxidation.

BRIEF SUMMARY OF THE INVENTION

In this invention there is provided a reservoir in which liquid level is retained constant, a syphon tube having a discharge arm which depends into the bottle to be filled, and a gas conduit which discharges into the syphon tube in the direction of syphon induced flow.

When gas is injected into the syphon tube, it reduces pressure therein and induces liquid flow, and at the same time displaces the air from within the bottle. If the gas contains no oxygen, oxidation of wine, for example, is reduced or avoided.

More specifically, according to this invention means for filling a bottle comprises a reservoir, a liquid inlet conduit in communication with the reservoir and having surface level responsive valve means arranged to maintain a liquid surface level within the reservoir, a syphon tube having an inlet arm entering the reservoir and terminating below said liquid surface level, a depending outlet arm having a discharge opening at its lower end, and a bridge portion extending between the upper ends of the arms, a gas control valve, connecting means on the upstream side of the gas control valve co-operable with complementary connecting means of a pressure gas supply, and a gas flow conduit extending downstream from the gas control valve terminating at its discharge end in the syphon tube and directed in the direction of syphon induced liquid flow, the arrangement being such that, in operation, a temporary discharge of gas from the gas flow conduit reduces pressure in the syphon tube sufficiently to induce liquid flow into a bottle into which said outlet arm depends, and at the same time displaces at least some of the air contained in the bottle with gas.

Further, according to this invention, a method of filling a bottle with liquid, wherein the bottle surrounds a depending outlet arm of a syphon tube which has its discharge opening at its lower end, the syphon tube having an inlet arm entering a reservoir and terminating below a liquid level therein and also having a bridge portion extending between the upper ends of the arms, there being a gas flow conduit connected to a supply of inert gas at pressure terminating at its discharge end in the syphon tube and directed in the direction of syphon induced flow, the method comprises maintaining liquid in the reservoir at said liquid level, injecting gas into the syphon tube to a. displace at least some of the air contained in the bottle with gas, and
b. reduce the pressure in the syphon tube sufficiently to induce liquid flow, and removing the bottle from the syphon tube after the liquid in the bottle has risen to said liquid level.

With this invention the valve can be operated to give a very short period flow of gas downwardly through the outlet arm, the gas flow extending for a sufficient period of time to draw liquid upwardly through the inlet arm and over the bridge portion of the syphon tube so that syphoning commences. If the gas which is used is of an inert nature (for example nitrogen or carbon dioxide) then at least some of that inert gas will remain within the bottle above the surface of the liquid. Further, the liquid is introduced for most of the duration of flow into the bottle beneath the surface of liquid already therein. Still further, the only restriction on diameter of the outlet arm is the diameter of the bottle neck, and therefore a relatively large diameter tube may be used which will enable the bottle to be filled more quickly.

BRIEF DESCRIPTION OF THE DRAWINGS

An embodiment of the invention is described hereunder in some detail with reference to and is illustrated in the accompanying drawings in which.

DETAILED DESCRIPTION OF THE DRAWINGS

Figure 1:
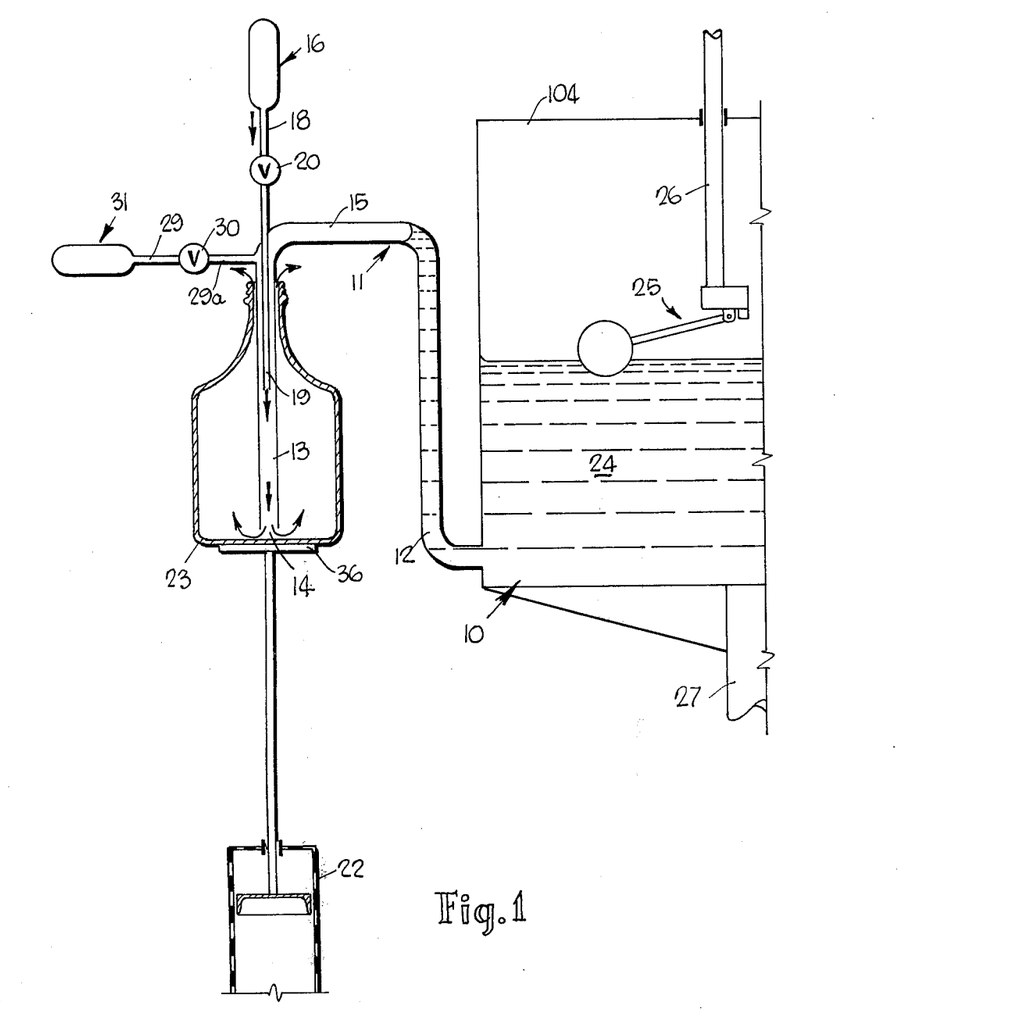
FIG. 1 is a diagrammatic view illustrating a temporary discharge of gas from a gas flow conduit inducing liquid flow through a syphon tube, FIG. 2 similarly illustrates liquid flow through the syphon tube which occurs after termination of the temporary discharge of gas from the gas flow conduit.

In the drawings, FIG. 1 illustrates a stage of the filling cycle. In FIG. 1 there is a diagrammatically illustrated a reservoir 10 having a syphon tube 11 extending through its side wall near its base, the syphon tube 11 comprising an inlet arm 12, an outlet arm 13 having a discharge opening 14 at its lower end, and a bridge portion 15.

A conduit 18 is connected to a supply of inert gas designated 16 maintained at super atmospheric pressure (about 3 atmospheres) and it is in direct line with a gas flow conduit 19 which extends part way down the outlet arm 13 of the syphon tube 11, but is provided with a valve 20 which is so arranged so as to temporarily open so that the syphon action is commenced as illustrated in FIG. 1.

FIG. 1 also shows an elevating cylinder 22 effective in raising a bottle 23 over the outlet arm 13.

The level of wine 24 within the reservoir 10 is maintained by means of a float valve 25 (or some other surface level responsive valve) which is carried on the discharge end of a pipe 26 which is in turn connected to a wine vat or tank (not shown). The reservoir 10 is carried on a standard 27 which is journalled in bearings in a base which is secured to a frame (not shown). The reservoir 10 forms part of a rotary head generally designated 28 in FIGS. 4 and 7, which rotates during the filling of the bottle 23. The rotary head 28 is rotationally driven in the same manner as many bottling machines, and details are not illustrated herein.

Figure 2:
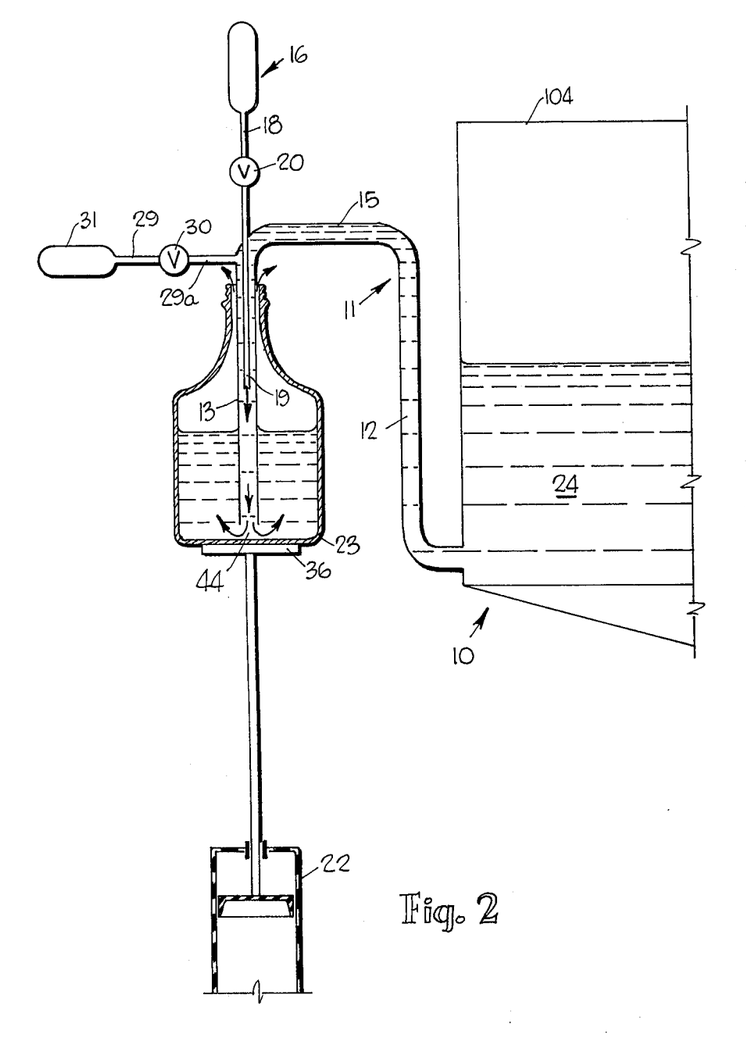

In FIG. 2 the syphon action is shown, this occurring after the valve 20 has closed. The bottle 23 continues to be filled with wine from the syphon tube 11. The gas which was discharged into the bottle 23 by opening the valve 20 is dispelled outwardly from the bottle 23 by the incoming wine 24.

Figure 3:
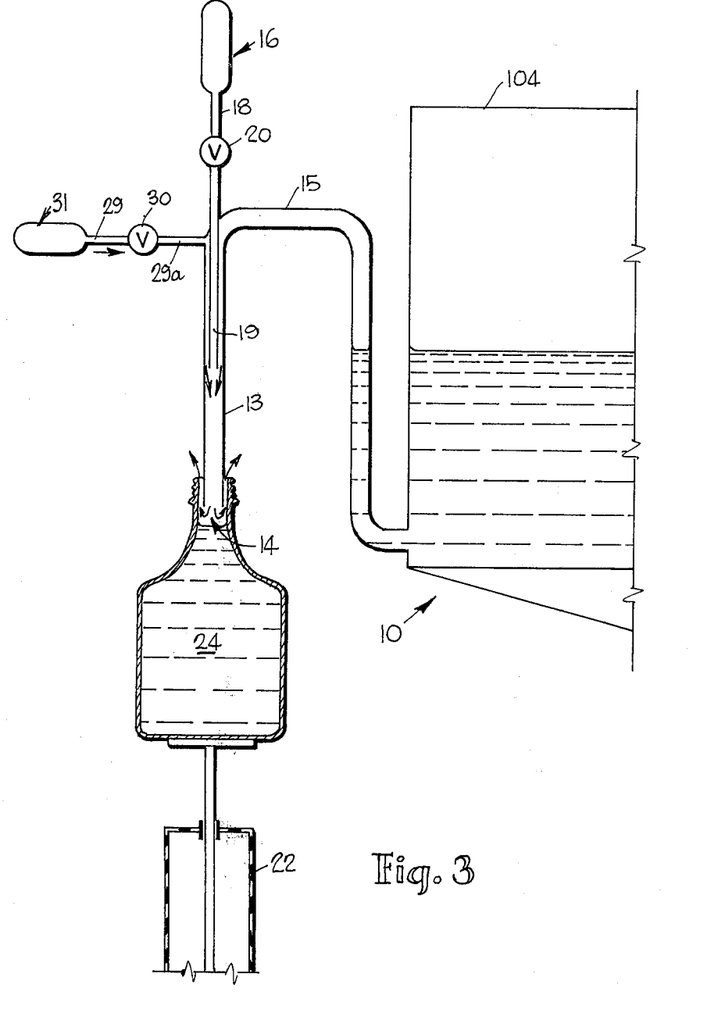
FIG. 3 illustrates diagrammatically a further stage wherein the syphon is broken by means of gas directed into the syphon tube.

When the bottle has been filled, that is, the level in the bottle is the same as the wine level in the reservoir 10, the bottle 23 is lowered by operation of the elevating cylinder 22. However to prevent continued syphoning of the wine while the bottle is being lowered, the syphon is first broken by directing a further quantity of inert gas from a gas bottle 31, through the conduit 29, through the valve 30 and further conduit 29a into the bridge portion 15. The gas is maintained in the gas bottle 31 under very much lower pressure than the gas from the conduit 18, and continues to flow outwardly through the outlet arm 13 during withdrawal of the bottle 23 from the outlet arm 13. The contents of the outlet arm 13 of course transfer to the bottle continuously as the bottle is lowered.

Figure 4:
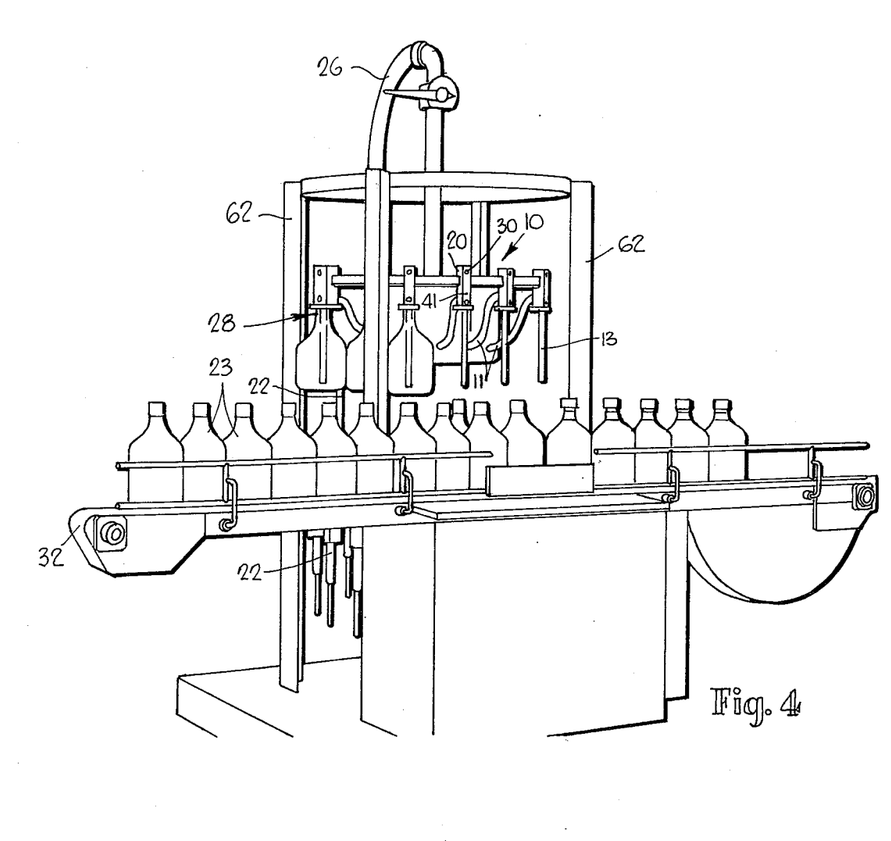
FIG. 4 is a perspective view of the front of a machine constructed according to this embodiment.

FIG. 4 illustrates the entire assembly of the machine showing the manner in which the bottles are fed onto the rotating head. This arrangement is further illustrated, together with details of the valves of the introduction of inert gas, in the drawings of FIGS. 5, 6, 7, 8 and 9.

Figure 8:
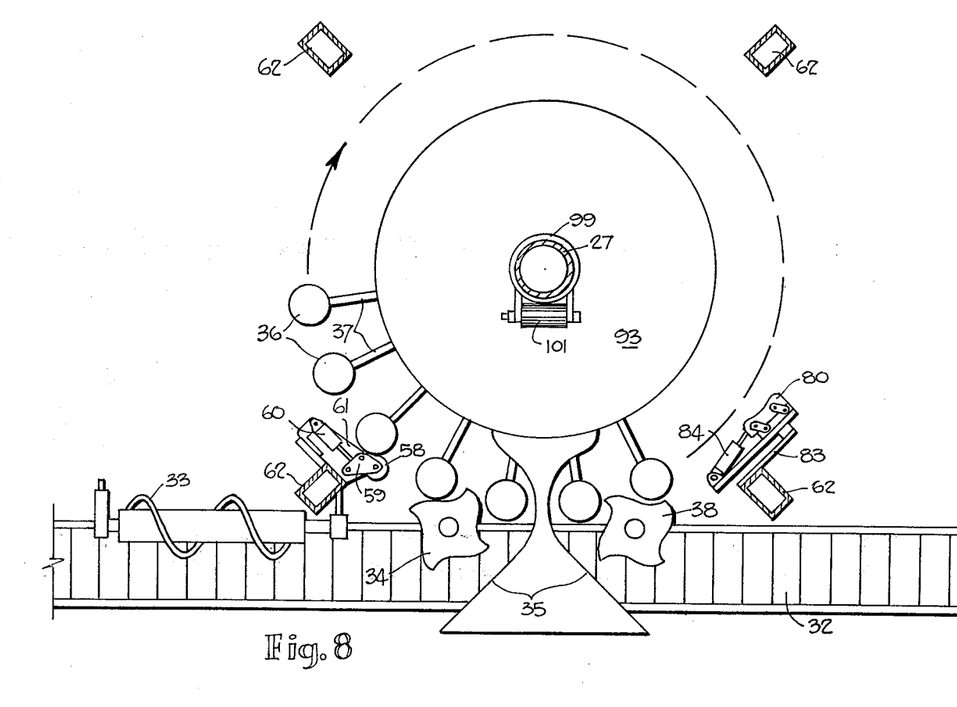
FIG. 8 is a sectioned plan view of the machine showing the positioning of the gas valve actuating means.

The bottles 23 are positioned by hand in line in a horizontal slat type conveyor belt 32 which has associated with a spiral 33, the spiral 33 being driven so as to correctly space the bottles from one another and to maintain an exact speed with reference to an infeed star 34. These features are best illustrated in FIG. 8. The bottles are deflected successively by the deflector plate 35 and are driven transversely of the conveyor belt 32 by the star 34. The star 34 transfers the bottles successively onto platforms 36, and each platform 36 being carried on the upper end of a piston rod of a respective elevating cylinder 22, itself being on the outer end of a radiating arm 37 which, together with the reservoir 10, forms portion of the rotary head 28. After filling, the bottles 23 are again transferred to the conveyor belt 32 by the outfeed star 38, this arrangement being in accordance with known art.

Figure 7:
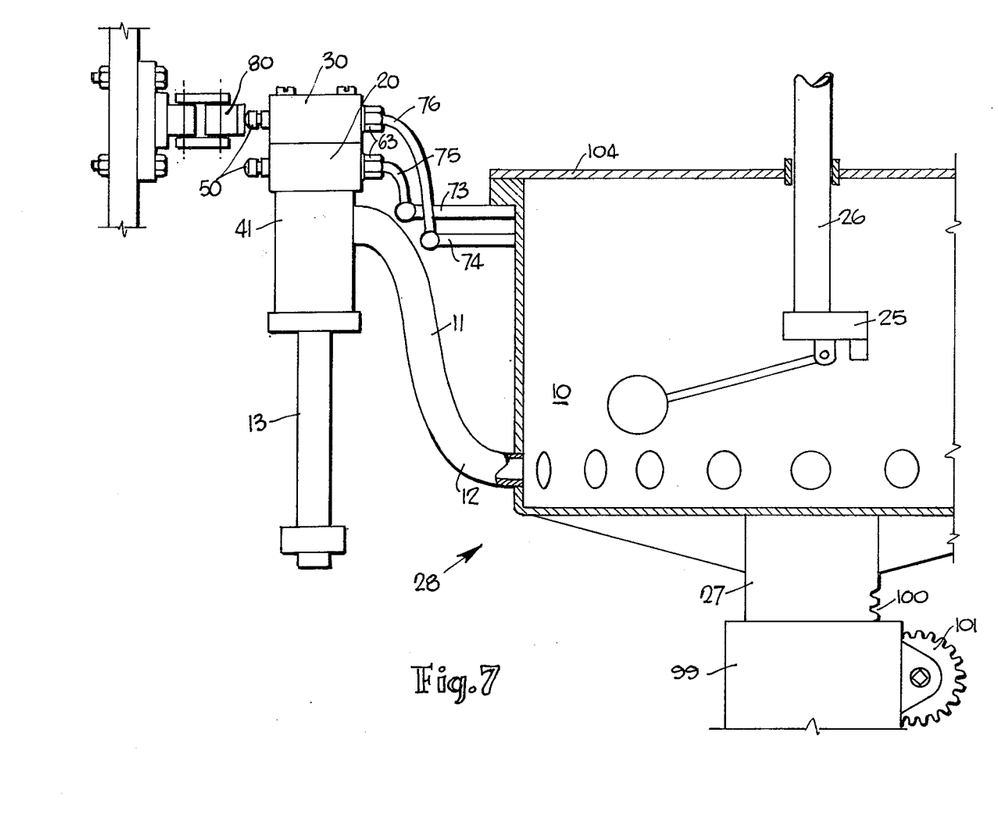
FIG. 7 is a fragmentary side elevational section illustrating one station at which the second valve is operated.

As shown more particularly in FIG. 7, the reservoir 10 has the inlet arms 12 of the respective syphon tubes 11 extending radially outwardly and carrying on their upper and outer ends support blocks 41. Each support block 41 has depending from it a tube 13 constituting an outlet tube, the outlet tube 13 being secured by means of a threaded head nut 42, (FIG. 5), and the upper end of the outlet arm 13 sealably engages its support block 41 through a resilient 0 ring designated 43. The lower end of each tube 13 is provided with a tapered flange 44 having an upper shoulder which supports a sliding centralising collar 46, the centralising collar having a tapered mouth 47 in its under surface which assists in locating the neck of the bottle 23 as it is raised upwardly over the tube 13 by means of the elevating cylinder 22.

Figures 5, 6:
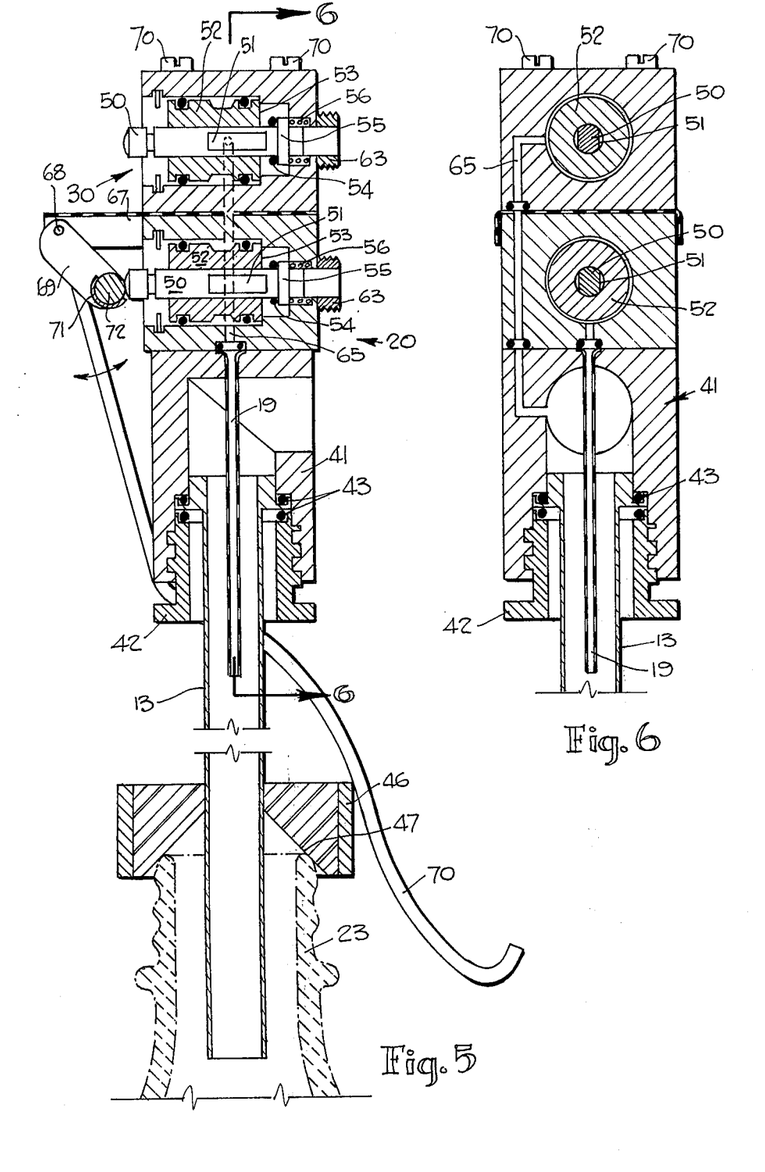
FIG. 5 is a side elevational section through a gas valve assembly.
FIG. 6 is a fragmentary section taken on line 6—6 of FIG. 5.

The two gas valves 20 and 30 are stacked on top of the support block 41 as shown in FIG. 5, each valve 20 and 30 having therein a slidable spool 50, each spool 50 being a rod-like member having a pair of flat portions 51 which enables passage of gas past the spool. Each spool 50 is slidable within a sleeve 52, the respective end faces 53 of the sleeves 52, constituting valve seats which are respectively engaged by 0 rings 54 which surround the spool 50 and are backed up by flanges 55 thereon. The spools are driven outwardly by means of springs 56, and the upper spool 50 (that is of the valve 20) is actuated by a roller 58 (FIG. 8) carried on a bell crank 59 which is actuated by a cylinder 60, the cylinder 60 being effective in retracting the roller 58 when it is not required to operate the valve 20. The arrangement is such that upon failure of power, the cylinder 60 withdraws under spring return action so that the inert gas will not be unnecessarily wasted. The cylinder 60 and bell crank 59 are carried on a bracket 61 secured to one of four posts 62 which form portion of a fixed frame.

Upon inward movement of either of the spools 50, the valve seat is opened and inert gas can flow from the inlet fitting 63 past the spool 50 and outwardly through the outlet port 65 of the respective valve.

Each valve 20 carries on it a guide bracket 67 which supports a hinge pin 68 carrying a pivotal arm 69 from which a lower extension 70 extends, the lower extension 70 being engageable by the sliding collar 46 only if and when a bottle lifts. The pivotal arm 69 comprises a cage 71 containing a roller 72 which temporarily depresses the spool 50 of valve 20. This arrangement avoids the danger of wasting gas should there be no bottle in position. As shown in FIGS. 5 and 6, the valves 20 and 30 are retained to the support block 41 by means of cap screws 70.

Figure 9:
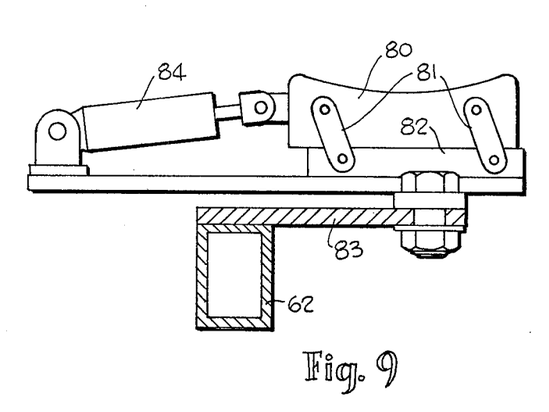
FIG. 9 is an enlarged view of the second valve actuating cam.

The pressure gas supply is fed from the respective gas cylinders (or from other suitable sources) at a pressure of about 3 atmospheres into the upper manifold 73, and about ½ a pound per square inch pressure into the lower manifolds 74. The respective pipes 75 and 76 conduct the gas from the manifolds to the inlet fittings 63. It will be seen that the valve 20 is supressed only for the short period of time taken to traverse the small roller 58, so that the high pressure gas is discharged from the gas flow conduit 19 for a very short duration of time. However the low pressure gas should be discharged over a longer period of time, and the spool 50 of the valve 30 engages a relatively elongate ramp 80 as shown in FIG. 7. The elongate ramp 80 is illustrated in detail in FIG. 9, and is supported by two pivoted parallel arms 81 from a block 82 which is adjustably secured to a bracket 83 on a post 62. The ramp 80 is coupled to the support bracket by means of a fluid pressure actuated cylinder 84 provided with spring return facilities, the arrangement being such that when no pressure air is provided to the cylinder 84 the elongate ramp 80 is in its retracted position as illustrated in FIG. 9, and is therefore inoperative. However when air is applied to the cylinder 84 the parallel arms 81 move the ramp 80 radially inwardly so that it becomes operative. This again is a safety device which ensures that the inert gas is not wasted should power supply fail while the spool 50 or the valve 30 is depressed. It will be noted that FIG. 7 does not illustrate the slidable latch 68 for the purpose of maintaining simplicity of drawing.

The operation of the elevating cylinders 22 is controlled by respective spool valves designated 90, each spool valve 90 being of the standard double acting type having three positions, namely a central or neutral position, an upper position wherein fluid is conveyed to the lower part of the cylinder 22, and a lower position wherein the fluid is conveyed to the upper part of the cylinder 22. This is diagrammatically illustrated in FIG. 10.

Figure 10:
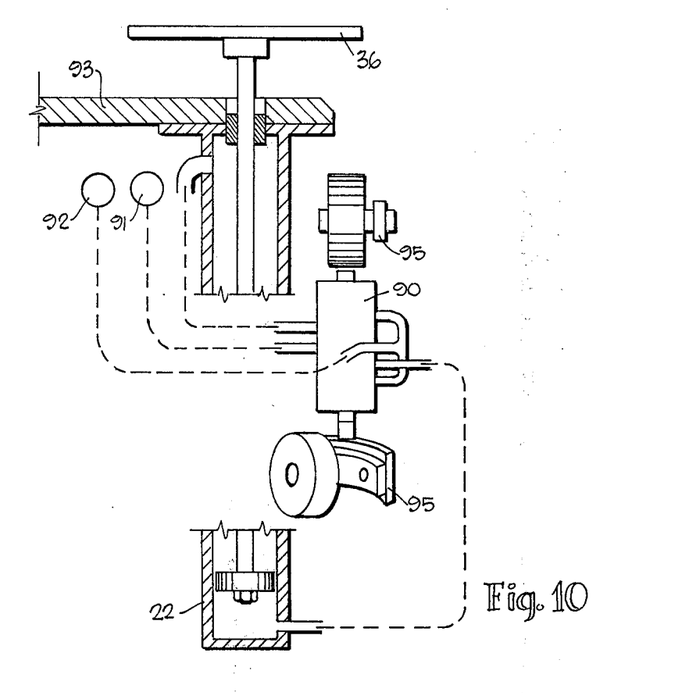
FIG. 10 is a fragmentary section illustrating the mechanism for raising and lowering of the bottles relative to the syphon tubes.

In FIG. 10 the spool valve is fed by pressure fluid from a manifold ring 91, there being a second manifold ring 92, both of which are secured to the under side of the table 93, which forms portion of the rotating head. The spool valve 90 rotates with the table, and is physically attached to the elevating cylinder 22 by means which are not shown herein.

The posts 62 have brackets 95 secured thereto, each bracket 95 having a respective roller 96 thereon, there being two rollers 96 at the beginning of the sequence as illustrated in FIG. 7, the first roller lifting the spool valve to in turn lift the elevating cylinder, the second roller 96 returning the spool valve to a mutual position.

Figure 11:
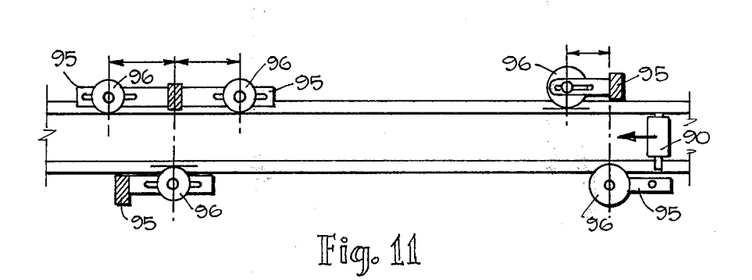
FIG. 11 is a diagrammatic stretch-out view illustrating the valve control means for the raising and lowering of bottles.

At the end of the cycle, three rollers 96 are encountered by the spool valve, the first roller 96 lowering the spool valve so as to partly but not completely lower the platform 36 on the elevating cylinder 22, the second of the three valves returning the spool valve to the neutral position before the lowering is completed, and this action being synchronised with the operation of the upper gas valve 30 so that the gas which issued upon opening of the gas valve 30 functions to displace any air which is in contact with the wine in the bottle. After the air has been displaced the third of the rollers 96 (shown at the extreme left hand end of FIG. 11) again lowers the spool of the spool value 90 to completely withdraw the bottle from the outlet arm 13 of the syphon tube. The four full lines on FIG. 11 illustrate the upper and lower limits of movement of the upper and lower ends of the spool of valve 90.

The standard 27 is supported in a boss 99 which is upstanding from the table 93, the standard 27 being slidable in the boss and adjusted for height by means of a series of rack teeth 100 which are engaged by the teeth of a pinion 101 which, upon rotation, raises or lowers the standard and with it the reservoir 10 and the syphon tubes 11 radiating outwardly therefrom.

The reservoir 10 is provided with a cover 104 (shown best in FIG. 7) for maintaining a layer of inert gas between the liquid surface level and the upper wall of the reservoir.

Conveniently the inert gas used is either carbon dioxide or nitrogen, and the fluid used for the actuation of the elevating cylinders 22 is liquid, since liquid will promote a smoother movement of the bottles. It will be appreciated that in the embodiment described and shown, the bridge portion between the two rams of the syphon tube is itself constituted by the aperture in the support block 41 in each instance.

It has been found that with this invention the filling rate may be considerably increased, the danger of oxidation is substantially reduced, and the danger of loss of gas due to power failure or other reasons is also substantially reduced. The foregoing description of representative embodiments may be amended and or substituted by one skilled in the art to include equivalent means or function without departing from the scope of the invention as recited in the claims.

We claim:
1. means for filling a bottle comprising
   a reservoir having a liquid surface level within the reservoir,
   a syphon tube having an inlet arm, a depending outlet arm and a bridge portion, the inlet arm entering the reservoir and terminating below said liquid surface level, the depending outlet arm having a discharge opening at its lower end, the discharge opening being located below said liquid surface level and in the bottle, and the bridge portion extending between the respective upper ends of the inlet and outlet arms,
   and means for inducing the syphon action flow of liquid from the reservoir through said tube to the discharge opening thereof comprising a supply of pressurized gas, a gas control valve connected to the gas supply, and a gas flow conduit extending downstream from the gas control valve terminating in the syphon tube in the direction of syphon induced liquid flow,
   whereby a temporary discharge of gas through the gas flow conduit reduces pressure in the syphon tube sufficiently to induce liquid flow into the bottle and at the same time displaces at least some of the air contained in the bottle with the gas.

2. Means for filling a bottle according to claim 1 wherein there is a plurality of said syphon tubes each radiating outwardly from said reservoir, and further comprising a plurality of support blocks secured to respective said syphon tubes, and a corresponding plurality of said gas control valves secured to respective support blocks.

3. Means for filling a bottle according to claim 2 wherein said depending syphon outlet arm comprises an upper end inserted in an aperture in a respective support block, and a resilient sealing ring effecting a seal between the outer surface of the syphon outlet arm and its support block.

4. Means for filling a bottle according to claim 2 further comprising centralising collars each having an upwardly converging lower wall and being slidable over a respective syphon outlet arm, each centralising collar being engageable over the outer surface of a bottle at its mouth.

5. Means for filling a bottle according to claim 2 further comprising a cover over said reservoir, a central opening in said cover, a pipe depending through said opening and terminating in said reservoir, and a float valve on the end of said pipe constituting a reservoir surface level responsive valve means.

6. (amended) Means for filling a bottle comprising
a frame having a base,
a standard upstanding from the base,
bearings between the base and standard supporting the standard for rotation about vertical axis,
a reservoir being secured to the standard and forming portion of a rotary head,
a liquid inlet conduit in communication with the reservoir and having a surface level responsive float valve thereon arranged to maintain a liquid surface level within the reservoir,
a plurality of syphon tubes radiating outwardly from the reservoir, each tube having an inlet arm, a depending outlet arm and a bridge portion, the inlet arm entering the reservoir and terminating below said liquid surface level, the depending outlet arm having a discharge opening at its lower end located below said liquid surface level and in the bottle, and the bridge portion extending between the respective upper ends of the inlet and outlet arms,
each syphon bridge portion comprising a support block for a gas control valve a pressure gas supply connected to the gas control valve and a gas flow conduit extending downstream from the gas control valve terminating in the syphon tube in the direction of liquid flow from the reservoir to the bottle,
whereby a temporary discharge of gas through the gas flow conduit reduces pressure in the syphon tube sufficiently to syphon induce liquid flow into the bottle and at the same time displaces at least some of the air contained in the bottle with the gas.

7. Means for filling a bottle according to claim 6 comprising further valves secured to respective said support blocks, respective conduits connecting the further valves to a further pressure gas supply, and further gas flow conduits connecting said further valves to the bridge portions of respective syphon tubes, each said further valve comprising a spool and a sleeve, each spool being slidable in its sleeve from an open to a closed position.

8. Means for filling a bottle according to claim 7 further comprising valve actuating means secured to said frame and arranged to intercept said valve spools upon rotation of the standard to thereby actuate the valves.

9. Means for filling a bottle according to claim 7 further comprising a plurality of elevating cylinders each secured to the rotary head and being in vertical alignment with respective said syphon outlet arms, the upper end of the piston rod of each cylinder terminating in a respective bottle support platform, a corresponding plurality of elevating cylinder control valves also secured to said rotary head, conduits interconnecting the control valves to respect elevating cylinders, and further conduits interconnecting the control valves to a pressure liquid supply manifold.

10. Means for filling a bottle according to claim 7 further comprising a plurality of elevating cylinders each secured to the rotary head and being in vertical alignment with respect said syphon outlet arms, the upper ends of the piston rod of each cylinder terminating in a respective bottle support platform, a corresponding plurality of elevating cylinders control valves also secured to said rotary head, conduits interconnecting the control valves to respective elevating cylinders, and further conduits interconnecting the control valves to a pressure liquid supply manifold, and wherein each said elevating cylinder control valve is a double acting spool valve having a neutral position, and elevating position and a lowering position, and further comprising brackets secured to the frame and carrying rollers so positioned that, upon rotation of said head, the rollers successively engage said valve spools to firstly effect raising of the respective elevating cylinder platforms, secondly return the respective valve spools to their neutral positions, thirdly lower the respective spools to thereby effect initial lowering of respective platforms, fourthly return the respective valve spools to a neutral position to arrest downward platform movement, and fifthly lower respective spools to effect final downward movement of respective platforms.

11. A method of filling a bottle with liquid, wherein the bottle surrounds a depending outlet arm of a syphon tube which has its discharge opening at its lower end, the syphon tube having an inlet arm entering a reservoir and terminating below a liquid level therein and also having a bridge portion extending between the upper ends of the arms, there being a gas flow conduit connected to a supply of inert gas at pressure terminating at its discharge end in the syphon tube and directed in the direction of syphon induced flow, the method comprising maintaining liquid in the reservoir at said liquid level, injecting gas into the syphon tube to a. displace at least some of the air contained in the bottle with gas, and b. reduce the pressure in the syphon tube sufficiently to induce liquid flow, and removing the bottle from the syphon tube after the liquid in the bottle has risen to said liquid level.

12. A method according to claim 11 further comprising directing further gas at super atmospheric pressure but at lower pressure than said injected gas, into said syphon tube after the liquid in the respective bottle gas risen to said liquid level but before the bottle is removed from said syphon tube.

* * * * *

UNITED STATES PATENT AND TRADEMARK OFFICE
CERTIFICATE OF CORRECTION

PATENT NO. : 3927700
DATED : December 23, 1975
INVENTOR(S) : John Thomas Trinne et al It is certified that error appears in the above-identified patent and that said Letters Patent are hereby corrected as shown below:

Claim 6, line 1, delete "(amended)"
Claim 9, line 9, "respect" should be -- respective --
Claim 10, line 4, "respect" should be -- respective --
Claim 10, line 5, "ends" should be -- end --
Claim 10, line 7, "cylinders" should be -- cylinder --
Claim 12, line 4, "gas" should be -- has --

Signed and Sealed this

Twenty-fourth Day of August 1976

[SEAL]

Attest:

RUTH C. MASON
Attesting Officer

C. MARSHALL DANN
Commissioner of Patents and Trademarks